United States Patent [19]
Lay et al.

[11] Patent Number: 5,905,096
[45] Date of Patent: May 18, 1999

[54] CONTINUOUS PRODUCTION PROCESS OF EXPANDABLE STYRENE POLYMER BEADS

[75] Inventors: Peter Nikolaus Lay, Ludwigshafen; Swen Rück, Worms; Michael Schiessl, Hassloch; Michael Witt, Dirmstein; Hans Dieter Zettler, Grüstadt; Michael Baumgärtel, Frankenthal; Gerhard Dembek, Bad Dürkheim; Klaus Hahn, Kirchheim; Jan Holoch, Leimen; Wolfram Husemann, Neustadt; Knut Kaempfer, Ludwigshafen, all of Germany

[73] Assignee: BASF Aktiengesellschaft, Ludwigshafen, Germany

[21] Appl. No.: 09/000,391
[22] PCT Filed: Aug. 19, 1996
[86] PCT No.: PCT/EP96/03633
§ 371 Date: Jan. 29, 1998
§ 102(e) Date: Jan. 29, 1998
[87] PCT Pub. No.: WO97/08231
PCT Pub. Date: Mar. 6, 1997

[30] Foreign Application Priority Data

Aug. 22, 1995 [DE] Germany ............... 19530765

[51] Int. Cl.$^6$ .................. C08J 9/16; C08J 9/18; C08J 9/20
[52] U.S. Cl. ............... 521/56; 521/58; 521/59; 521/60
[58] Field of Search ................. 521/56, 58, 59, 521/60

[56] References Cited

U.S. PATENT DOCUMENTS 2,566,567  9/1951  Hutchinson et al. .
5,043,404  8/1991  Mahabadi et al. ............. 526/194

FOREIGN PATENT DOCUMENTS 57010610   1/1981   Japan .
60-206846  10/1985  Japan .
412 919    of 0000  Russian Federation .

*Primary Examiner*—Morton Foelak
*Attorney, Agent, or Firm*—Keil & Weinkauf

[57] ABSTRACT

A continuous process for preparing bead-form expandable styrene polymers in which the styrene is prepolymerized in bulk to a conversion of 10 to 80%, the prepolymer is dispersed in liquid form in an aqueous phase in the presence of suspension stabilizers, and the polymerization of the prepolymer is completed in an aqueous suspension to a residual styrene content of less than 2000 ppm.

15 Claims, No Drawings

CONTINUOUS PRODUCTION PROCESS OF EXPANDABLE STYRENE POLYMER BEADS

The present invention relates to a continuous process for the preparation of expandable styrene polymers.

Expandable particles of styrene polymers (EPS) have been known for some time and have been described many times in the literature.

Such products are usually prepared by suspension polymerization, in which the organic phase containing the monomers and, if used, the initiators and further organic auxiliaries is distributed and polymerized in an aqueous phase in the form of droplets. The blowing agent, usually a low-boiling hydrocarbon, is usually added during the polymerization or in a subsequent step.

JP-A-82-10,610 describes a two-step batch process in which bulk polymerization of the styrene in a stirred reactor is followed by suspension polymerization. This method gives a narrow bead-size distribution of the polymer.

However, the conventional batch processes for the preparation of EPS have the typical disadvantages of this method: there are quality variations between the individual batches, and the process is labor-intensive.

In addition, the batch method is also unfavorable for the preparation of EPS from the energetic point of view. In spite of the exothermic character of the reaction, energy is required at the beginning to heat the reaction mixture and to initiate the polymerization.

Processes for the continuous polymerization of vinyl monomers in bulk or suspension or in a combination thereof are also known.

For example, U.S. Pat. No. 2,566,567 describes a process for the preparation of polystyrene beads in which styrene is prepolymerized in bulk to a conversion of about 70%, and the prepolymer is cooled and granulated. The granules are then suspended in a viscous aqueous solution, and the polymerization is then completed in a continuous tower reactor.

SU-A-412 919 describes a continuous process for the preparation of polystyrene particles in which the styrene is first polymerized to a conversion of 30–40%, suspended in aqueous solution and polymerized in a series of 4 to 6 reactors separated by confuser/diffuser bushes.

However, these processes are not suitable for the preparation of styrene polymers containing blowing agents, since firstly the presence of a blowing agent reduces the stability of the beads, so that coalescence in the aqueous suspension must be expected, and secondly addition of the blowing agent means that the process must be carried out under superatmospheric pressure. In addition, the process of SU-A-412 919 has the further disadvantage that the polymer obtained has a relatively high residual styrene content which is unacceptable for polystyrene foams.

It is an object of the present invention to develop a continuous process for the preparation of EPS which is simple to carry out and gives beads having a narrow bead-size distribution and a low residual styrene content.

We have found that, surprisingly, this object is achieved by a process for the continuous preparation of expandable styrene polymer particles which comprises
 a. polymerizing the styrene in bulk to a conversion of from 10 to 80%,
 b. dispersing the prepolymer in liquid form in an aqueous phase in the presence of suspension stabilizers, and
 c. completing the polymerization of the prepolymer in aqueous suspension to a residual styrene content of less than 2000 ppm, it being possible for the blowing agent to be added in any of the three steps.

JP-A 57 010 610 and JP-A 60 206 846 describe the preparation of expandable polymers of styrene or α-methylstyrene in which, in a first step, the polymerization is carried out to completion in aqueous suspension in the presence of suspension stabilizers. There is no mention in either case of carrying out the two-step process continuously.

For the purposes of the present invention, styrene polymers are polystyrene or copolymers of styrene containing up to 50% by weight, based on the copolymer, of at least one further olefinically unsaturated monomer.

Examples of suitable comonomers are α-methylstyrene, ring-halogenated styrenes, ring-alkylated styrenes, acrylonitrile, esters of acrylic or methacrylic acid with alcohols having 1 to 8 carbon atoms, N-vinylcarbazole, maleic acid and maleic anhydride. The styrene polymer advantageously contains a small amount of a copolymerized branching agent, ie. a compound containing more than one, preferably 2, double bonds. The branching agent is generally used in amounts of from 0.005 to 0.1% by weight, based on the styrene polymer.

The following details apply to the individual steps of the novel process:

In step a., the styrene or the mixture of styrene and the comonomers is polymerized continuously in bulk to a conversion of from 10 to 80%, preferably from 20 to 70%, in particular from 40 to 60%.

It is also possible first to carry out the polymerization in bulk to a conversion of from 50 to 80% and then to dilute the polymer with styrene to a content of from 20 to 70%.

The polymerization is preferably carried out thermally, but conventional polymerization initiators can also be added. The polymerization initiators used are usually peroxides, for example dibenzoyl peroxide, dicumyl peroxide or di-tert-butyl peroxide.

The bulk polymerization is carried out in the reactors which are conventional for this purpose. Preference is given to stirred-tank reactors with evaporative cooling or recycle reactors. Recycle reactors comprising Sulzer mixing reactors are particularly suitable. The advantage of this alternative is that the reaction and heat dissipation are effected separately, and that the exothermic reaction is controlled reliably.

When a stirred reactor with evaporative cooling or a recycle reactor is used, the waste heat in the condenser can be used to prewarm the various polymerization feeds, such as styrene, stabilizer solution, blowing agent or additives, to the requisite temperatures. The feed temperature of the styrene employed for the bulk polymerization should be from 10 to 150° C., preferably from 20 to 50° C.

The reaction temperature is from 120 to 200° C. if the polymerization is initiated thermally and usually from 80 to 150° C. if an initiator is used.

The dimensions of the reactor in step a. of the novel process should be such that the mean residence time of the styrene is from 0.1 to 5 hours, preferably from 1 to 3 hours. In this time, the styrene polymerizes magnesium pyrophosphate and an extender containing sulfonate groups.

The aqueous phase containing the suspension stabilizer should be warmed before mixing with the organic phase. The temperature of the aqueous phase should be selected so that the temperature of the suspension after the dispersion step is from 80 to 160° C., preferably from 110 to 140° C.

In order to warm the aqueous phase, it may be advantageous to use the heat of reaction liberated during polymerization of the styrene in the first step.

In the third step c. of the novel process, the polystyrene/styrene beads produced in the second step are polymerized to completion in suspension.

This is usually carried out in the presence of conventional polymerization initiators, as listed above, which are metered into the organic phase before the dispersion step.

The suspension polymerization can be carried out in reactors which are conventional for this purpose. Suitable examples are stirred reactors with continuous flow, for example reactors and tubular reactors with or without static stirring elements, Sulzer mixing reactors and tubular reactors. Step c is preferably carried out in a single reactor.

The suspension is preferably moved through a tubular reactor having an l:d ratio of greater than 1000:1, preferably greater than 10,000:1, in turbulent plug flow, during which complete polymerization of the styrene takes place.

Preference is given to tubular reactors with turbulent flow, since coalescence of the beads is suppressed therein and a uniform residual styrene content over all the beads is achieved as a consequence of the narrow residence-time distribution. The reactor can also be divided into a plurality of temperature zones having different temperatures.

When selecting the size of the reactors for the third step of the novel process, it should be ensured that the residence time of the reaction mixture in the reactor is sufficiently long to ensure virtually complete conversion of the styrene. A residual styrene content of greater than 2000 ppm should be avoided for ecological reasons. Preference is given to residual styrene contents of less than 1000 ppm.

After the beads have been separated from the aqueous phase, they are worked up as described above. The work-up is carried out in the same way as after batch preparation of EPS and comprises, for example, drying, screening and coating of the beads. Any marginal fractions which cannot be sold can be recycled into the first step after dissolution in styrene or after melting.

Blowing agents which can be employed in the novel process are the compounds known from the batch preparation of EPS. Preference is given to $C_3$- to $C_7$-hydrocarbons, in particular propane, butane, isobutane, n-pentane, isopentane, neopentane and/or hexane, or mixtures of these hydrocarbons with carbon dioxide. The amount of blowing agent is usually from 3 to 8% by weight, based on the styrene polymer.

The blowing agent can be introduced in any of the three steps of the novel process. It is possible to introduce all the blowing agent in one portion or in more than one portion.

The blowing agent is preferably introduced during the bulk polymerization step or during the dispersion step. This forces a reduction in the viscosity of the styrene polymer, which has an advantageous effect on the size distribution of the organic particles. If carbon dioxide is used as blowing agent or a constituent of the blowing agent, it is advantageous to employ a carbon dioxide adsorber as described in EP-A-542 066.

During the process or during the work-up, the conventional additives can be added. The additives impart certain properties on the expandable styrene.

Examples which may be mentioned are flameproofing agents based on organic halogen compounds, in particular bromine and/or chlorine compounds, such as trisbromopropyl phosphate, hexabromocyclododecane, chlorinated paraffins, and synergists for flameproofing agents, such as dicumyl and highly unstable organic peroxides, furthermore antistatics, stabilizers, dyes, lubricants, fillers and substances which have an antiadhesive effect during prefoaming, such as zinc stearate, melamine-formaldehyde concentrates, or silicic acid, and agents for shortening the demolding time during final foaming, such as glycerol esters and/or hydroxycarboxylic esters. Depending on the intended action, the additives can be distributed homogeneously in the particles or can be in the form of a surface coating.

Additives which are intended to be homogeneously distributed in the particles are preferably added to the beads before the dispersion step. The surface coatings are, as is generally customary, applied to the beads after final polymerization.

It is also possible to add polymer additives to the expandable styrene polymers prepared in accordance with the invention. For example, the addition of polyphenylene ethers, in particular poly(2,6-dimethyl-1,4-phenylene ether), or poly-1,4-phenylene sulfide cause an increase in the heat resistance of the styrene polymers. Addition of elastomers, such as acrylonitrile-butadiene-styrene polymers (ABS), allows the elasticity of the foam to be increased. In addition, addition of polymers such as polyacrylonitrile or styrene-acrylonitrile copolymers allows the oil and fuel resistance of the foams to be improved.

These polymers are preferably added by dissolution in the monomeric styrene before commencement of the polymerization by metered addition in styrene solution during the bulk polymerization, in particular immediately before the dispersion step. However, it is also possible, for example, to melt the polymers in an extruder and to add them in this form to the reaction mixture during the bulk polymerization.

The novel polymerization can also be carried out in the presence of chain-transfer agents, which regulate the molecular weight. Preference is given here to tert-dodecyl mercaptan or dimeric alpha-methylstyrene (DMS). The chain-transfer agents are usually added in an amount from 0.001 to 1.0% by weight, based on the weight of the monomers. The addition to the reaction mixture is carried out, in particular, during the bulk polymerization, preferably immediately before the dispersion step. It is also possible to add branching agents, which are usually used in amounts of from 0.001 to 0.1% by weight. Branching agents are monomers containing more than one, preferably two, polymerizable double bonds, such as butadiene, isoprene, vinylcyclohexene, vinyl acrylate, divinylbenzene, glycol dimethacrylate, butanediol dimethacrylate and hexanediol dimethacrylate. They are added to the reaction mixture analogously to the regulators.

The exapandable styrene polymer particles prepared by the novel process generally have a diameter of from 0.2 to 4 mm. The particle diameters can be controlled readily and precisely through the dispersion process used. For example, when a static mixer is used, the particle size d' can be reduced, for example, by increasing the flow rate in the mixer. Increasing the length:diameter ratio in the static mixer also reduces the particle size d' until the equilibrium value is reached.

An increase in the stabilizer concentration generally results in a reduction in the particle size d'. The particle-size distribution β can also be modified through the dispersion conditions and the stabilizer system employed.

Thus, the particle-size distribution becomes broader with increasing viscosity of the styrene polymer, for example through an increase in the conversion in the first step.

If an intensive mixer is used as the dispersion element, the particle size d' can easily be set in the range from 0.5 to 1.2 mm by adjusting the shear rate in the rotor/stator. If the dispersion is carried out in a stirred reactor with continuous flow, the particle-size distribution can be modified within a broad range by means of the stirrer speed and by means of reactor internals, for example baffles.

The blowing-agent-containing styrene polymer particles prepared by the novel process can be prefoamed by conventional methods, for example using steam, to give foam particles having a diameter of from 0.1 to 2 cm and a bulk density of from 0.005 to 0.1 g/cm³.

The particles prefoamed in this way can be foamed to completion by known methods to give foam moldings having a density of from 0.005 to 0.1 g/cm³.

The invention is described in greater detail with reference to the examples below:

EXAMPLE 1

50 kg/h of styrene at 80° C. were metered into a recycle reactor. The recycle reactor comprised a pump having a maximum delivery rate of 2 m³/h and two Sulzer mixing reactors of equal volume. The overall reactor volume was 100 l, and the reaction temperature was set at 146° C. The residence time was selected so that the monomer conversion was about 50%.

3.5 kg/h of pentane and 0.25 kg/h of dicumyl peroxide were metered into the styrene prepolymer from the recycle reactor. In order to achieve homogeneous mixing, the mixture was passed through a static mixer.

The styrene prepolymer was metered into 54 kg/h of a 0.5% strength solution of polyvinyl alcohol in water at 120° C. in a Kenics static mixer having an empty tube diameter of 9 mm and a length of 1600 mm. The temperature in the mixer was 130° C.

The suspension produced in this way was passed through a turbulent tubular reactor having a diameter of 16 mm and a length of 2500 m. The residence time was 4 hours, and the temperature was held at 130 to 140° C. At the end of the tubular reactor, the suspension was cooled to 35° C. and discharged from the apparatus via a star valve of pressure-tight design.

The bead polymer obtained was separated from the aqueous phase by means of a screen centrifuge, washed with water and dried on the surface.

The mean bead diameter d' and the size distribution β were determined.

100 parts of the expandable polystyrene granules having a bead size of from 0.7 to 1.0 mm were coated with 0.4 parts of glycerol monostearate for 4 minutes in a paddle mixer.

A portion of the coated beads was treated with flowing steam for 6 minutes in a Rauscher batch prefoamer, and the bulk density was then determined.

The results are shown in the Table.

EXAMPLE 2

The procedure was as in Example 1, but the following stabilizer was employed:

A solution of 1900 g of Na₃PO₄·12H₂O in 30 l of water and a solution of 1250 g CaCl₂·2H₂O in 20 l of water were added with stirring to 200 l of water. 200 g of a 10% strength solution of Messolat® K 30 (Bayer AG) were added to this solution.

The values measured on the resultant beads are shown in the Table.

TABLE

|  | Example 1 | Example 2 |
| --- | --- | --- |
| Mean bead diameter d' (mm) | 0.74 | 0.82 |
| Bead size distribution β | 16.0 | 16.9 |
| Pentane content (% by weight) | 6.1 | 6.0 |
| Bulk density after 6 min (g/l) | 14.2 | 13.8 |
| Residual styrene content (ppm) | <1000 | <1000 |

We claim:

1. A continuous process for the preparation of bead-form, expandable styrene polymers by polymerization of styrene which can contain up to 50% by weight, based on the styrene polymer, of other olefinically unsaturated monomers, in the presence of from 1 to 10% by weight of at least one volatile blowing agent, which comprises
   a. prepolymerizing the styrene in bulk to a conversion of from 10 to 80%,
   b. dispersing the prepolymer in liquid form in an aqueous phase in the presence of suspension stabilizers, and
   c. completing the polymerization of the prepolymer in aqueous suspension to a residual styrene content of less than 2000 ppm.

2. A process as claimed in claim 1, wherein the polymerization in step a. is carried out to a conversion of from 40 to 60%.

3. A process as claimed in claim 1, wherein in step a the polymerization is carried out to a conversion of from 50 to 80% and the polymer is then diluted with styrene to a content of from 20 to 70%.

4. A process as claimed in claim 1, wherein step c. is carried out in a single reactor.

5. A process as claimed in claim 4, wherein the suspension is moved through a tubular reactor having an l:d ratio of greater than 1000:1 in turbulent plug flow, during which the final polymerization takes place.

6. A process as claimed in claim 1, wherein in steps b and c a suspension stabilizer system comprising calcium phosphate or magnesium pyrophosphate together with compounds containing sulfonate groups is employed.

7. A process as claimed in claim 1, wherein the blowing agent employed is a $C_3$–$C_7$-hydrocarbon.

8. A process as claimed in claim 1, wherein the blowing agent employed is carbon dioxide or a $C_3$–$C_7$-hydrocarbon mixed with carbon dioxide.

9. A process as claimed in claim 1, wherein the blowing agent is added in step a.

10. A process as claimed in claim 1, wherein the blowing agent is added immediately before step b.

11. A process as claimed in claim 1, wherein step a. is carried out in a recycle reactor.

12. A process as claimed in claim 1, wherein step a. is carried out in a stirred reactor.

13. A process as claimed in claim 1, wherein step b. is carried out in a static mixer.

14. A process as claimed in claim 1, wherein step b. is carried out in a dynamic mixer.

15. A process as claimed in claim 1, wherein step b. is carried out in a stirred reactor.

* * * * *